United States Patent
Breton

[11] 3,860,094
[45] Jan. 14, 1975

[54] SELF-TIGHTENING BRAKE FOR BICYCLES, MOTORCYCLES AND THE LIKE

[76] Inventor: Roger Breton, Galerias D.M.S. Calle Poniente 9, Salou-Tarragone, Spain

[22] Filed: Dec. 17, 1973

[21] Appl. No.: 425,113

[30] Foreign Application Priority Data
Dec. 26, 1972 France................................. 72.47126

[52] U.S. Cl................ 188/24, 188/72.2, 188/250 B
[51] Int. Cl................................................ B62l 1/12
[58] Field of Search............ 188/24, 26, 72.2, 73.1, 188/250 B, 242

[56] References Cited
UNITED STATES PATENTS
| | | | |
|---|---|---|---|
| 3,664,468 | 5/1972 | Oka | 188/72.2 |
| 3,727,727 | 4/1973 | Hauth | 188/72.2 |

FOREIGN PATENTS OR APPLICATIONS
| | | | |
|---|---|---|---|
| 1,043,421 | 11/1953 | France | 188/24 |
| 897,819 | 4/1945 | France | 188/24 |
| 261,868 | 12/1926 | Great Britain | 188/24 |
| 447,263 | 4/1949 | Italy | 188/24 |
| 445,704 | 2/1949 | Italy | 188/24 |
| 979,576 | 4/1951 | France | 188/24 |

*Primary Examiner*—Trygve M. Blix
*Assistant Examiner*—Edward R. Kazenske
*Attorney, Agent, or Firm*—Karl F. Ross; Herbert Dubno

[57] ABSTRACT

A bicycle or motorcycle brake has a pair of caliper arms each carrying a brake shoe assembly comprising a box-like casing open toward the wheel rim and a brake shoe slidable in this box. The box has a back wall which is inclined from a rear end wall toward a front end wall into the direction of displacement of the wheel adjacent the brake and the brake shoe is formed with a wedge wholly received between these end walls and two side walls parallel to the displacement direction. This wedge is formed with a planar sliding surface which engages the back wall of the box, and the wedge is substantially shorter than the box so that it can slide therein. A compression spring bears against the rear end wall and against the wedge to push this wedge toward the front end wall, and the wedge is formed on its ends with projections riding on the edges of the end walls so that the box is closed and the brake shoe is in good force-transmitting relationship with the box. A guide such as a rod through the wedge and secured in the end walls or in the form of interfitting grooves and ridges on the sides of the wedge and the inside faces of the side walls guides the wedge in the box casing. The casing can comprise a metal core encased in a synthetic-resin mass.

10 Claims, 6 Drawing Figures

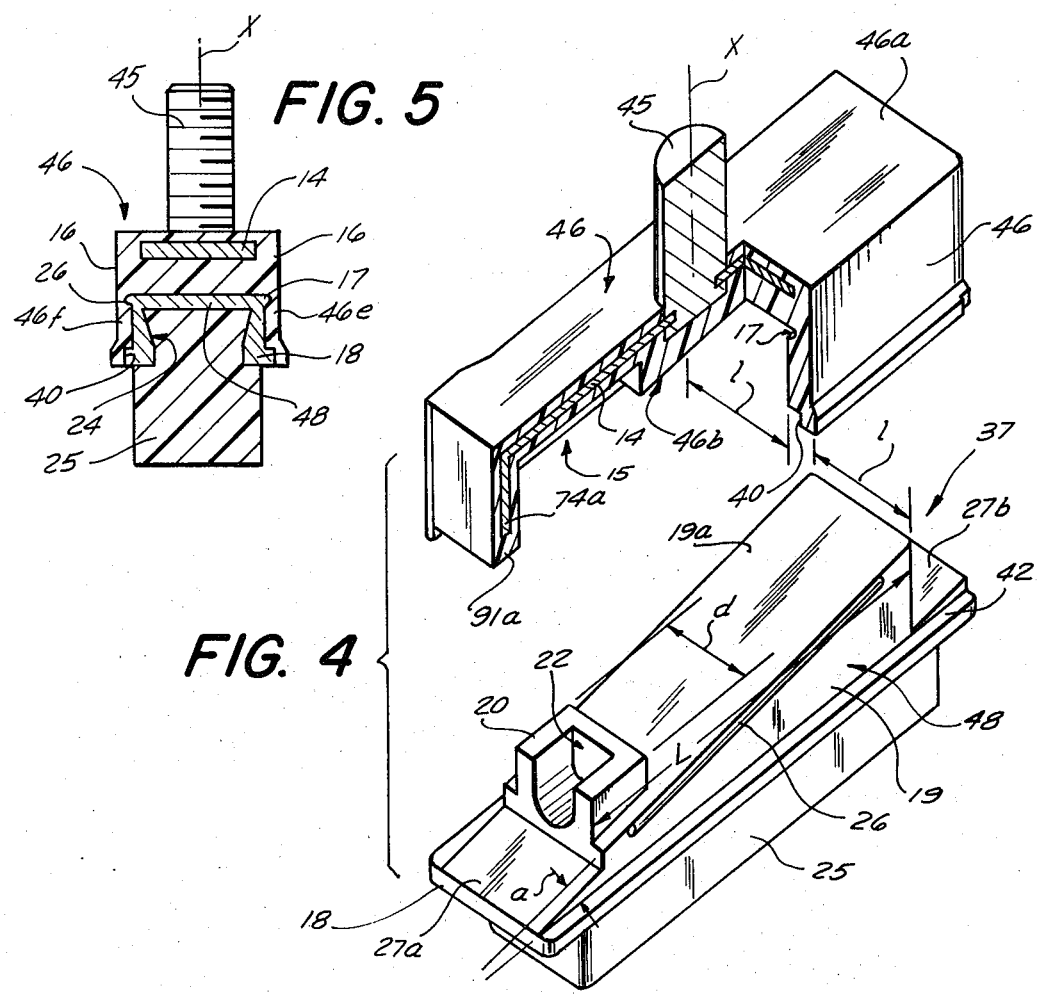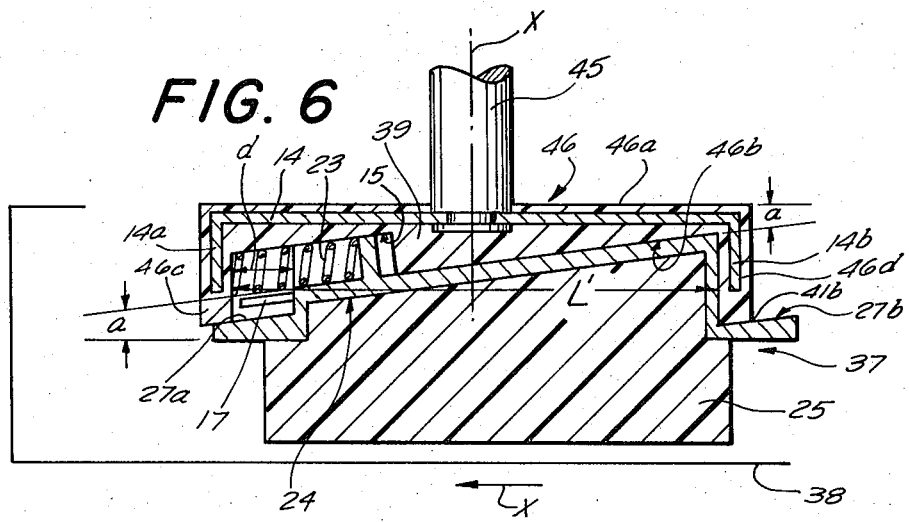

SELF-TIGHTENING BRAKE FOR BICYCLES, MOTORCYCLES AND THE LIKE

FIELD OF THE INVENTION

The present invention relates to a caliper brake. More particularly this invention concerns a self-tightening brake usable on a bicycle, motorcycle, or the like.

BACKGROUND OF THE INVENTION

In a brake used to arrest a surface which moves in a predetermined direction past the brake it is customary to press a brake shoe against the surface by advancing it perpendicularly to the direction of movement of the surface. Such a brake on a bicycle or motorcycle has a pair of such shoes which are carried on respective arms that constitute a scissor linkage actuatable to pinch the brakeshoes together on the rim of the vehicle's wheel. This scissor linkage is formed by a pair of crossing caliper arms having respective pivots seated in a support in turn pivotal about an axis parallel to the plane of rotation of the wheel. A bowden cable or the like is used to pull together the two ends of the arms opposite the ends carrying the brake shoes so as to grab the wheel rim and slow or arrest this wheel.

It has been suggested to provide a so-called self-tightening brake structure. Such brakes have almost invariably been bulky and failure-prone. In particular it is often necessary to provide an inclined ramp to force the brake pad into the wheel rim once the brake is actuated, as well as means to return the pad to its starting position along the ramp. The shoe often jams or the return fails, in which case the brake is no longer self tightening.

OBJECTS OF THE INVENTION

It is therefore an object of the present invention to provide an improved caliper brake.

Another object is the provision of an improved brake for a bicycle, motorcycle, or the like.

Yet another object is to provide an improved brake shoe mounting assembly in a self-tightening brake which overcomes the above-given disadvantages.

SUMMARY OF THE INVENTION

These objects are attained according to the present invention in a brake having a casing displaceable toward and away from the surface to be braked and having a back wall inclined toward the surface from a front end wall to a rear end wall and having two side walls extending parallel to the direction of displacement of the surface past the brake and giving the casing the shape of a box open on one side toward the surface. The brake shoe has a brake pad with a face engageable flatly against the surface and carried on a support provided with a wedge wholly received within the walls of the box casing and having an inclined face sliding on the back wall of the casing. This wedge is guided in the casing and has a length in the direction of surface displacement which is substantially less than the length of the casing between the end walls. A spring is compressed between the rear end wall of the box casing and the wedge so as to urge this wedge against the front end wall, in which position the brake pad is at its farthest spacing from the surface to be braked. When the pad is pressed against the moving surface it is forced up on the ramp of the box casing and thereby automatically tightens on the wheel without the necessity of increasing the brake-actuation pressure.

Such an arrangement is extremely useful in the caliper type of arrangement used in bicycles and motorcycles since the considerable losses in the linkage that operates the brake, usually a Bowden wire could otherwise make full actuation of these brakes firmly a difficult operation.

According to another feature of this invention the brake pad and its support are dovetailed together and an abutment is provided at the end of the brake-pad support toward the rear end wall of the casing so as to prevent the pad from falling out.

In accordance with yet another feature of the present invention there is provided guide means between the casing and the brake-pad support to hold these two elements together while permitting relative longitudinal movement therebetween. This guide can be a pin or rod secured in the end walls and extending parallel to the side walls and to the back wall. The wedge is formed with a throughgoing hole parallel to its sliding face. Advantageously the compression spring is mounted on this rod. In accordance with yet another feature of the present invention the wedge and/or the casing is made at least principally of elastically deformable but stiff synthetic-resin material, such as a polyamide or polytetrafluorethylene, and the sides of the wedge and the inner surfaces of the side walls are formed with interfitting ridges and grooves extending parallel to the two inclined sliding surfaces. In this arrangement the wedge is formed with an abutment projecting above its sliding face and the ramp surface of the back wall of the casing is formed adjacent the rear end wall with a pocket receiving this abutment, the spring being compressed in this pocket between the abutment and the rear end wall. The wedge in such an arrangement is simply shaped into place in the casing, which may have a metal core for increased rigidity.

Such a brake is extremely robust, yet all the working parts of the self-tightening structure are enclosed. This is aided in accordance to the present invention by providing on the support a skirt having planar surfaces turned toward the casing which are parallel to the inclined ramp surface of the wedge and which ride on similar surfaces formed at the edges of the end walls turned toward the braked surface. The skirts extend longitudinally beyond the outline of the casing by a distance at least equal to the difference between the longitudinal length of the back wall and the wedge, that is the extent of relative longitudinal movement between these two, so that they cover the open side of the casing in all positions while providing further camming surfaces between the brakeshoe and the casing.

DESCRIPTION OF THE DRAWING

The above and other objects, features, and advantages of the invention will become more readily apparent from the following description, reference being made to the accompanying drawing in which:

FIG. 4 is an exploded view partly broken away through another type of brake element according to this invention; and

3

FIGS. 5 and 6 are cross and longitudinal sections, respectively, through the structure of FIG. 4.

SPECIFIC DESCRIPTION

Figure 1:
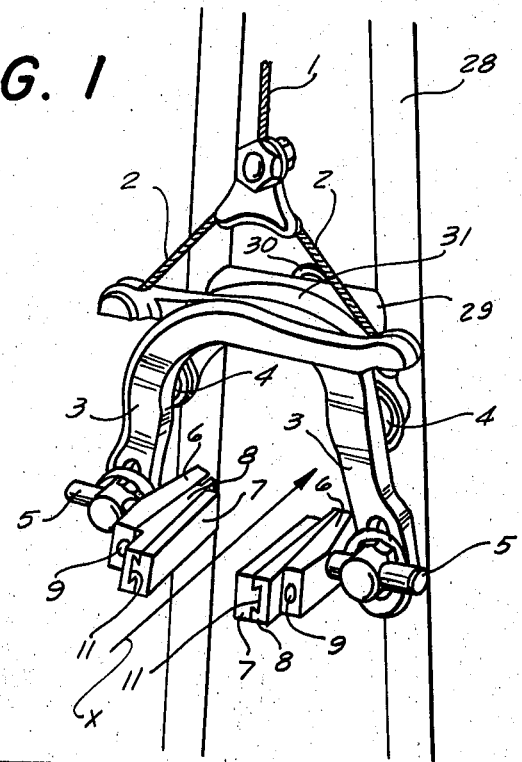
FIG. 1 is a perspective view of a brake according to the present invention.
Figure 2:
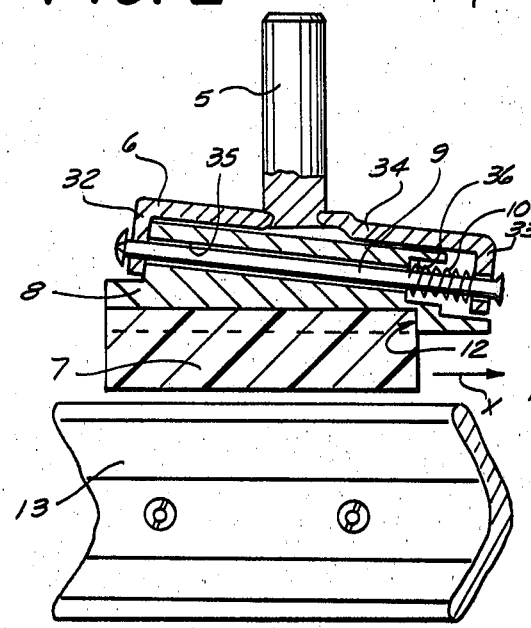
FIGS. 2 and 3 are sections through one of the brake elements in two different operative positions.
Figure 3:
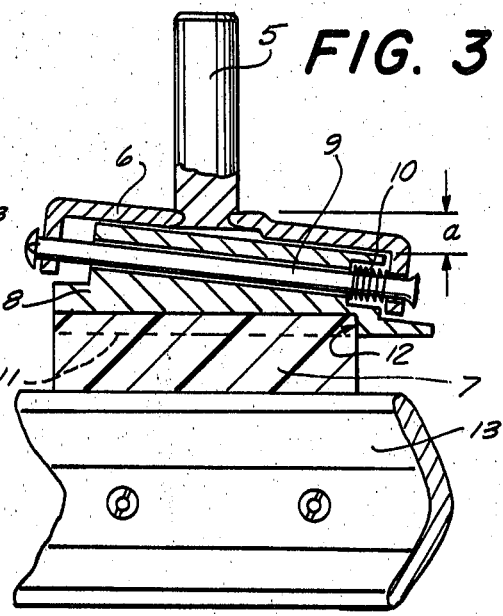

As shown in FIG. 1 a bicycle has a frame 28 on which a support 29 carries a pivot pin 30 on which is mounted a yoke 31 carrying a pair of pivots 4 for a pair of caliper arms 3 each having one end operated by a cable 2 connected to a cable core 1 of a Bowden cable and another end carrying a pin 5. A casing 6 in which is slidable a support 8 carrying a brake pad 7 is carried on each pin 5, and a wheel has a rim 13 generally rotatable in a direction x adjacent the pad 7 as shown in FIGS. 2 and 3.

The pad 7 is received in the support 8 in a blind dovetail groove 11 having an end surface 12 constituting an abutment against which the pad is pushed when it is applied against the rim 13. The carrier 6 has a front end wall 32 and a rear end wall 33 extending parallel to each other from a back end wall 34 which is inclined at an angle $a$ of between 5° and 10°, here 60°, to the direction $x$. A steel pin 9 passes through these two walls 32 and 33 and through a hole 35 in the support 8 which is slidable along the wall 34. The end of the support is formed around the bore 35 accommodating the pin 9 with a counterbore 36 in which a compression spring 10 bearing against rear end wall 33 is seated, this spring 10 surrounding the pin 9. In this arrangement the whole brakeshoe 8, 11 is urged by the spring 10 against the front end wall 32 which corresponds to the position in which the pad 7 is furthest from the rim 13, as shown in FIG. 2.

When actuated the pin 5 is moved toward the rim 13. As soon as the pad 7 engages this rim 13 it slides in the direction $x$ of displacement of the rim against the force of the spring 10. This sliding action automatically tightens the pad 7 on the brake as this pad is cammed toward the rim by the surface 34. Thus the operator need not increase the pressure he is exerting on the lever or twist-grip to increase the braking pressure since the brakes automatically self-tighten once applied. When released, as the pads 7 leave contact with the rim they automatically pull away from this rim, snapping back to the rest position shown in FIG. 2.

The arrangement shown in FIGS. 4–6 has a carrier 46 mounted on a threaded pin 45 defining an axis X perpendicular to the direction $x$ of displacement of the surface to be braked, here shown at 38, and receiving a brake shoe generally indicated at 37. The carrier 46 is comprised basically of a steel core 14 having bent over ends 14a and 14b and no side walls, so that this element 14 is generally U-shaped. The core 14 is surrounded by a mass 39 of synthetic resin which completely encapsulates the core 14 to protect it from corrosion, and which gives it the shape necessary for the carrier 46. An inner back wall 46b of this carrier extends at an angle $a$, here 7°, to the outer back wall 46a, which itself is orthogonal to the axis X and parallel to the direction $x$. The wall is formed with a pocket 15 adjacent the rear end wall 46c. The side walls 46e and 46f of the carrier 46 are parallel to the direction 46 and formed at the corner between their inner surfaces and the wall 46b with groves 17 parallel to the wall 46b. Adjacent their other edges the walls 46e and 46f are formed with a setback 40.

The brake shoe 37 comprises a metal carrier or backing plate 18 having a recess 24 into which is snugly fit-

4 ted an elastomeric brake pad 25 which is engageable with the surface 38. This recess 24 is of dovetail cross-sectional shape as shown in FIG. 5. The backing plate 18 is formed with a wedge 19 having a planar upper surface 19a adapted to slide on the surface 46b. An abutment 20 formed at the front end of this surface 19a fits within the pocket 15 and is formed with a seat 22 for a spring 23 whose other end presses against rear end 46c. The wedge 19 has a transverse width $l$ which is identical to the transverse width $l$ between side walls 46e and 46f and the abutment 20 has a transverse width $d$ whcih is substantially less than this width $l$ so that the brake shoe 37 is supported firmly on this surface 46b. The wedge 19 has an overall length L parallel to the direction $x$ which is less than the similarly measured length L' by a difference $d$ equal to approximately L'/8. The wedge 19 is formed along its upper edges with ridges 26 which snugly engage in the grooves 17.

This apparatus functions much as the one of FIGS. 1–3. When the pad 25 engages the surface 38 it slides from the front end wall 46d toward the rear end wall 46c against the force of spring 23, with the inclined surfaces 46b and 19a forcing the pad out in the direction of axis X. The extent of displacement is equal to the distance $d$.

The brake shoe is formed on its longitudinal edges with projecting lips 42 which fit snugly in the offsets 40 in the rest position of FIG. 6. At its front and rear ends the support 18 is formed with projecting skirts having surfaces 27a and 27b which ride on similar surfaces 41a and 41b which are inclined parallel to the faces 19a and 46b so that these surfaces also provide for a firm support of the brake shoe on the carrier. These surfaces 27a and 27b are long enough so that they overlie the edges 41a and 41b in all positions of the brake shoe 37 in the carrier 46, thereby preventing dirt or other foreign matter from entering the interior of the assembly.

Due to the limited elastic resiliency of the side walls 46e and 46f, the brake shoe 37 is fitted into place simply by being forced between these walls until the ridges 26 fit into the guide grooves 17. Replacement of the brake shoe is similarly possible by simply prying it out and pushing in a replacement.

I claim:

1. A brake for arresting a surface displaceable in a predetermined direction past said brake, said brake comprising:
   a box casing having a generally planar back wall turned toward said surface, a pair of longitudinal parallel side walls extending from said back wall toward said surface and generally parallel to said direction, and a front end wall and a rear end wall each bridging said side walls and extending from said back wall, said end walls being parallel and spaced in said direction, said back wall being inclined into said direction at an acute angle from said rear end wall to said front end wall;
   means for displacing said casing toward and away from said surface generally perpendicularly to said direction;
   a brake shoe having a brake pad frictionally engageable with said surface and a holder carrying said pad and provided with a wedge wholly receivable between said side walls and between said end walls and having a generally planar face inclined to said direction and flatly engaging said back wall, said wedge having a longitudinal length in said direction less than the longitudinal length of said back wall in said direction between said end walls;

means for securing said shoe longitudinally slidably in said casing, whereby on sliding of said shoe in said casing said pad moves generally perpendicularly to said direction; and a compression spring enclosed in said casing and having one end bearing on said rear end wall and another end bearing on said wedge to urge same toward said front end wall.

2. The brake defined in claim 1 wherein said surface is on a wheel rotatable adjacent said brake shoe.

3. The brake defined in claim 2 wherein said holder is provided with a longitudinal projection extending under the edge of at least one of said end walls turned toward said surface, said projection having a planar surface parallel to said back wall and engaging said edge.

4. The brake defined in claim 3 wherein said projection has a longitudinal length at least equal to the difference between said longitudinal lengths of said wedge and of said back wall, whereby said surface of said projection remains in contact with said edge over the entire travel of said brake shoe relative to said casing.

5. The brake defined in claim 4 wherein said holder is provided at both of its longitudinal ends with such projections.

6. The brake defined in claim 2 wherein said holder is formed with a recess of dovetail cross section and with an abutment adjacent said rear end wall, said brake shoe being snugly fitted into said recess and against said abutment.

7. The brake defined in claim 2 wherein said means for securing said shoe includes a rod secured in said end walls of said casing and extending parallel to said side walls and to said back wall, said wedge being formed with a throughgoing hole receiving said rod.

8. The brake defined in claim 2 wherein at least one of said side walls has an inner guide surface engaging said wedge and said wedge has at least one outer guide surface engaging said inner guide surface, at least one of said guide surfaces being formed with a groove parallel to said back wall, said means for securing said shoe including a ridge formed on the other guide surface and slidably engaged in said groove.

9. The brake defined in claim 8 wherein said side walls are limitedly elastically deflectable toward and away from one another, whereby said holder can be forced in between said side walls for engagement of said ridge in said groove.

10. The brake defined in claim 9 wherein said holder includes a metal core extending along said back wall and into said end walls, and a synthetic resin mass surrounding said core and forming said side walls.

* * * * *